(12) United States Patent
Dang

(10) Patent No.: US 6,400,670 B1
(45) Date of Patent: *Jun. 4, 2002

(54) DEVICE FOR THE WRITING AND/OR READING OF OPTICAL RECORDING MEDIA OF VARIOUS STRUCTURES

(75) Inventor: Lieu-Kim Dang, Villingen-Schwenningen (DE)

(73) Assignee: Deutsche Thomson-Brandt GmbH, Villingen-Schwenningen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,578

(22) PCT Filed: Nov. 22, 1996

(86) PCT No.: PCT/EP96/05148

§ 371 Date: Aug. 14, 1998

(87) PCT Pub. No.: WO97/21215

PCT Pub. Date: Jun. 12, 1997

(30) Foreign Application Priority Data

Dec. 4, 1995 (DE) .......................................... 195 44 966

(51) Int. Cl.[7] ................................................. G11B 7/00
(52) U.S. Cl. .................... 369/112; 369/118; 369/44.24; 369/94
(58) Field of Search ................................. 369/112, 109, 369/103, 118, 110, 44.23, 44.24, 44.14, 44.12

(56) References Cited

U.S. PATENT DOCUMENTS

| | | | | |
|---|---|---|---|---|
| 4,733,065 A | * | 3/1988 | Hoshi et al. ............. | 369/44.14 |
| 5,157,555 A | * | 10/1992 | Reno ........................... | 359/823 |
| 5,281,797 A | * | 1/1994 | Tatsuno et al. ........... | 250/201.5 |
| 5,701,287 A | * | 12/1997 | Hineno et al. .............. | 369/110 |
| 5,787,061 A | * | 7/1998 | Tsuchiya et al. ............ | 369/110 |
| 5,798,994 A | * | 8/1998 | Kamarani .................... | 369/112 |
| 5,838,502 A | * | 11/1998 | Park et al. ................... | 369/112 |

FOREIGN PATENT DOCUMENTS

| | | | |
|---|---|---|---|
| EP | 414380 | * | 2/1991 |
| EP | 537904 | * | 4/1993 |
| EP | 731457 | * | 9/1996 |
| EP | 0737964 | | 10/1996 |
| JP | 5-54414 | * | 3/1993 ................. 369/112 |
| JP | 5-120720 | * | 5/1993 |
| JP | 6-20298 | * | 1/1994 |

OTHER PUBLICATIONS

*Patent Abstracts of Japan, vol. 17, No. 491, Sep. 6, 1993 & JP 5–120720.*
**Patent Abstracts of Japan, vol. 018, No. 235, Apr. 28, 1994 & JP 6–20298.*

* cited by examiner

Primary Examiner—Nabil Hindi
(74) Attorney, Agent, or Firm—Joseph S. Tripoli; Paul P. Kiel

(57) ABSTRACT

The present invention relates to a device for the reading and/or writing of optical recording media [(AT)] of various structures, which device operates with a single objective lens [(OL)]. The invention proposes to use a diaphragm varying in diameter, in particular a polarizing filter arranged in the optical path in order to adapt the aperture to each type of optical recording medium [(AT)] used. The wavefront can be corrected using a divergent lens [(SL)] which can also be positioned in the beam path. The Diaphragm formed by the polarizing filter PF is linked to the objective lens [(OL)]. The field of application of the invention relates to, in particular, devices for reading and/or writing optical recording media [(AT)] of various structure such as compact discs and digital video discs.

18 Claims, 2 Drawing Sheets

Figure 1:
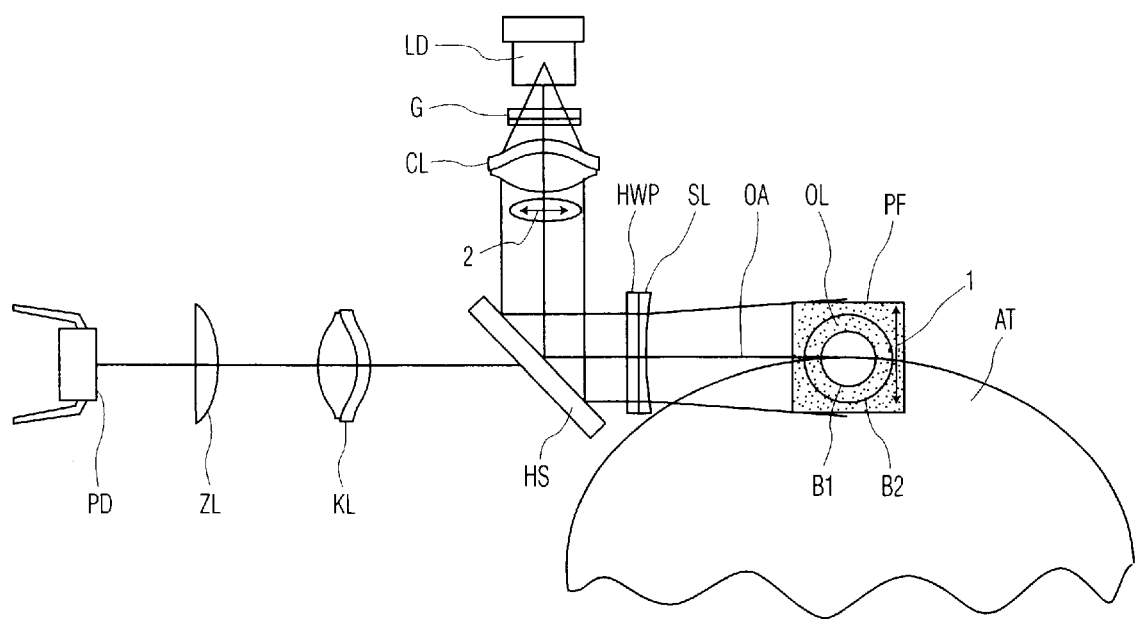

DEVICE FOR THE WRITING AND/OR READING OF OPTICAL RECORDING MEDIA OF VARIOUS STRUCTURES

The present invention is concerned with a device for writing to and/or reading from optical recording media having different structures such as, for example, recording media of high storage density in the form of a videodisk and recording media of low storage density corresponding to a known CD.

A device of this type is disclosed, for example, in DE 43 08 531. In the case of this known device, a defocusing means is introduced into the beam path in order deliberately to defocus the light which is incident on a detector device and to produce a scanning spot size which is adapted to the type of optical recording medium. However, this presupposes that the recording media have a structure that corresponds right down to the pit size.

However, optical recording media such as, for example, compact discs (CD) or digital videodisks (DVD) have different substrate thicknesses. Reading and/or writing therefore require different numerical apertures, which correspondingly require different objective lenses and different aperture angles.

The object of the invention, therefore, is to propose a device for writing to and/or reading from optical recording media having different structures which also makes it possible to write to and/or read from optical recording media having different substrate thicknesses using just one objective lens.

This object is achieved by means of the measures specified in the independent claims.

The invention provides for the objective lens to have a diaphragm of variable diameter. The functions of diaphragm and objective lens are preferably integrated in one component, but it also lies within the scope of the invention to design the objective lens and the diaphragm as components which are independent but combined with one another. The diaphragm used here may be, for example, a mechanical diaphragm which can be set to different diameters, or different diaphragms of varying diameter which can be introduced into the beam path, or else other suitable diaphragms. One advantage of the arrangement according to the invention resides in the fact that the lens is adapted, that is to say corrected, to that optical recording medium whose numerical aperture is large. The diaphragm having the largest possible diameter is used in this case. The arrangement works with a smaller diaphragm opening for an optical recording medium which requires a smaller numerical aperture. In this way, not only is the numerical aperture set correctly, but also the negative effects of the lens not being optimally corrected to this optical recording medium are mitigated. The wavefront perturbations are reduced by the smaller diaphragm diameter.

The objective lens must be corrected to the wavefront perturbation caused by the substrate thickness of the optical recording medium, a corresponding numerical aperture must be set. This is not the case with the device disclosed in the prior art. The single objective lens used there cannot be optimally corrected to any of the possible substrate thicknesses, the correction of the lens necessarily constitutes a compromise. This has the disadvantage that the optical detector arrangement reacts extremely sensitively to tilting of the optical recording medium and to local thickness changes in the transparent protective layer thereof. Moreover, the spot formation on the detector is not uniform since the wavefronts are perturbed, which may lead to consequential errors.

The diaphragm of variable diameter can advantageously be formed by a liquid-crystal element which consists, for example, of one or more annular regions which can be switched to allow passage or effect blocking, and consequently determine, in combination with one another, the size of the diaphragm opening.

The diaphragm can advantageously be formed by a polarization filter, which acts as a diaphragm in interaction with suitable polarization means, which determine the polarization of the light beam. In general, the light beam is generated by a laser diode which emits largely polarized light. An additional optical element for changing the polarization can be introduced into the beam path. The polarization filter is designed in such a way that it represents different diaphragm diameters for light of varying polarization. In the simplest case, the polarization filter has a circular hole which forms the diaphragm opening in the blocking direction, whereas in the passage direction the diaphragm opening is formed by the boundary of the objective lens.

If the polarization filter is directly coupled to the objective lens, then the diaphragm moves together with the objective lens in the event of the objective lens being displaced along the optical axis, as a result of which the numerical aperture determined by the diaphragm size remains constant even during this tracking movement. A tracking movement of this type occurs, for example, in order to be able to compensate for the so-called vertical wobble of the optical recording medium. In this case, the polarization filter can be coupled mechanically to the objective lens or advantageously be directly fitted thereon, for example bonded on.

A particularly simple option for rotating the polarization direction of linearly polarized light consists in introducing a so-called half-wave plate, also called $\lambda/2$ plate, into the beam path. If an additional diverging lens is introduced into the beam path, then this can be used for wavefront correction of the objective lens to a different substrate thickness. The objective lens is generally corrected to a specific substrate thickness, adaptation to the different substrate thickness taking place via the diverging lens. At the same time, the distance of the focal point from the objective lens is increased. Exact adjustment of the diverging lens in the beam path is unnecessary when it is combined with a small diaphragm diameter. The diverging lens used here may be a conventional diverging lens or, alternatively, any other suitable optical element which serves for wavefront correction, for example a holographic element.

The diverging lens is preferably coupled to a further optical element, for example to the polarization means, the diaphragm or the like. If the diverging lens and the further optical element are components to be brought simultaneously into the beam path, then they can be optimally coupled together in this way, with the result that only a single adjustment for both components is necessary. However, it may also be advantageous to couple the diverging lens to a component which should not be in the beam path at the same time, the coupling then ensuring that the two components are not located in the beam path at the same time.

The device according to the invention is particularly suitable for use with optical recording media which contain digitally recorded information.

Further advantageous requirements of the invention can be gathered from the following description of an exemplary embodiment with reference to the figures.

Figure 2:
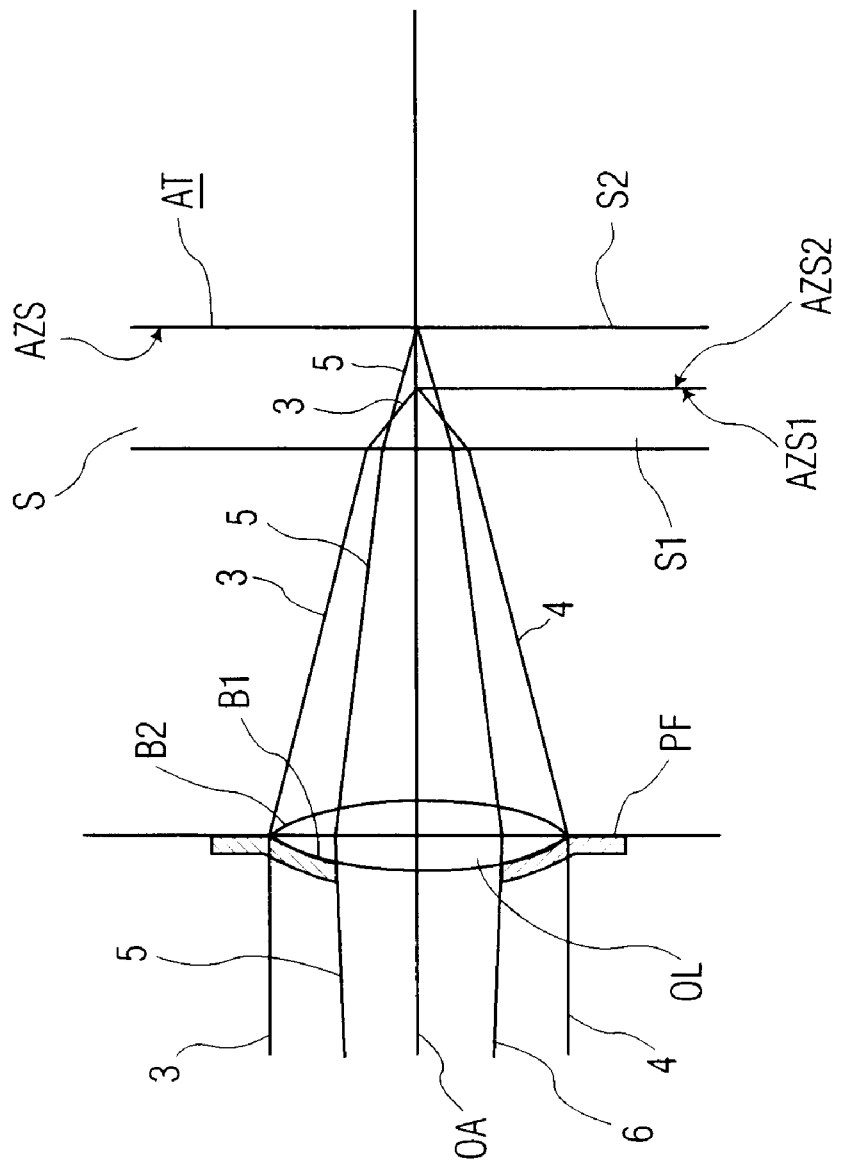

The invention is explained in more detail using an exemplary embodiment together with drawings, in which:

FIG. 1 shows a schematic sketch of a device according to the invention, with part of the illustration having been pivoted through 90°, and FIG. 2 shows a side view of the region which is illustrated after having been pivoted in FIG. 1.

According to the schematic sketch, illustrated in FIG. 1, of a reproduction and/or recording device for optical recording media AT of varying storage density, a scanning device which, in accordance with FIG. 1, consists of a laser diode LD, a grating G, a collimator lens CL, a semi-transparent mirror HS, a half-wave plate HWP, which is also referred to as a λ/2 plate, a diverging lens SL, an objective lens OL, a polarization filter PL, a concave lens KL, a cylindrical lens ZL and a detector PD is used in a reproduction and/or recording device which is provided both for playing back and/or writing to audio CDs and digital videodisks. In this case, in contrast to the other parts of the figure, the objective lens OL, the polarization filter PF and the recording medium AT are illustrated in the viewing direction of the optical axis OA.

Although the digital videodisk, called DVD below, and an audio disk, called CD below, have a different storage density, the scanning unit illustrated in FIG. 1 can be used equally for both types of recording media AT. The higher storage density of a DVD is achieved by a smaller pit size and a reduced track spacing in comparison with the CD. At the same time, the DVD has a smaller substrate thickness than the CD, that is to say the respective transparent substrate layer S1 and S2 covering the recording layer AZS which carries the recorded information is thinner in the case of the DVD than the corresponding substrate layer S of a CD, in this respect see FIG. 2 as well. In general, the thickness of the substrate layer S1 and S2 of a DVD is about 50% of the substrate thickness of a CD, with the result that a DVD, given the same total thickness as a CD, can, in contrast to the said CD, be designed with the capability of being written to and/or read from on both sides.

In order to reproduce the information stored on a recording medium AT or record corresponding information, it is necessary to adapt the diameter of the scanning beam or writing beam, respectively, to the size of the storage elements or pits, respectively, that are used and also to the substrate thickness. In order that both the smaller pits of a DVD and the larger pits of a CD can be read using the scanning device indicated in FIG. 1, the objective lens OL is first provided with a polarization filter PF. The half-wave plate HWP and the diverging lens SL can then be introduced into the beam path and removed therefrom. This arrangement can be used to realize different light spot diameters on the information medium AT. The scanning device illustrated is advantageously used both for recording media AT of high storage density and of low storage density.

If data are read from the recording media AT having different substrate thicknesses and/or recorded on the recording medium AT by means of the scanning device which is indicated in FIG. 1 and has a single objective lens OL, then the wavefront is perturbed by the substrate layer S, S1 or S2, the corresponding perturbation turning out differently for different substrate thicknesses. The same applies to a plurality of recording layers AZS of a so-called multilayer disk which are arranged one above the other and can be read from and/or written to on one side. The numerical aperture of the different types of recording media AT is sometimes very different indeed. Thus, the numerical aperture for a wavelength of 650 nm is about 0.6 for a DVD, whereas it is about 0.38 for a CD at the same wavelength. It is therefore necessary to alter the aperture correspondingly changing from a recording medium AT of high storage density to a recording medium AT of low storage density. This takes place according to the invention by adapting the diameter of a diaphragm of variable diameter.

A polarization filter PF, which is arranged directly on the objective lens OL, is provided for this purpose in the exemplary embodiment. It has a circular hole whose boundary B1 forms the smaller diaphragm which is suitable for CDs, while the outer boundary B2 of the objective lens OL forms the larger diaphragm which is suitable for DVD. The polarization filter PF is preferably arranged on that side of the objective lens OL which faces away from the recording medium AT, since it is then possible to achieve an effective diaphragm opening which is larger than the arrangement on the recording medium side.

The polarization direction of the polarization filter PF is indicated by the double arrow 1 and corresponds to the polarization direction of the light emitted by the laser diode LD. The polarization direction of this light is indicated by the double arrow 2. At the same time, the polarization direction is not restricted to the direction specified in the exemplary embodiment.

Neither the half-wave plate HWP nor the diverging lens SL are located in the beam path during the read-out of a DVD. Since the light impinging on the polarization filter PF has the same polarization direction, it passes through the polarization filter PF unhindered, the effective diaphragm size is predetermined by the boundary B2 of the objective lens OL.

If the intention is to read a CD, then the half-wave plate HWP and the diverging lens SL are introduced into the beam path, as illustrated in FIG. 1. The optical axis of the half-wave plate HWP is in this case arranged rotated through 45° with respect to the polarization direction of the incident light beam, with the result that the beam leaving the half-wave plate HWP has a polarization direction rotated through 90°. The light polarized in this way can only pass through the circular hole in the polarization filter PF unhindered, whereas that region of the polarization filter PF which is situated between the boundaries B1 and B2 is impervious to the impinging light on account of the polarization direction rotated through 90°. The effective diaphragm is consequently defined by the boundary B1, the numerical aperture is correspondingly smaller. The diverging lens SL is likewise introduced into the beam path for the read-out of a CD. It serves for correcting the wavefront of the light reflected from the recording medium AT, since the objective lens OL is corrected to the layer thickness of a DVD as recording medium AT.

The order of half-wave plate HWP and diverging lens SL in the beam path is not restricted to the order specified in the exemplary embodiment. It is even practical to arrange the diverging lens SL on that side of the half-wave plate which faces the laser diode LD, to be precise with the curvature facing towards the laser diode LD. This has the advantage that slight reflections which cannot be completely eliminated even by a coating do not follow parallel to the beam path, and thus do not cause an interference signal at the detection means PD.

In FIG. 2, the objective lens OL, the polarization filter PF and the recording medium AT are depicted rotated through 90° in comparison with FIG. 1. At the same time, the recording medium AT is diagrammatically illustrated as a CD above the optical axis OA and, as an alternative to this, as a DVD below the optical axis OA. The CD has a single recording layer AZS, which is covered with a transparent substrate layer S having a thickness of 1.2 mm. A DVD, on the other hand, has two recording layers AZS1 and AZS2, which are respectively covered by a substrate layer S1 and S2 and can be read from and/or written to on different sides, in this case on the left and right, respectively.

The outermost two beams 3,4 indicate the beam path for the read-out of a DVD. To the left of the objective lens OL, they run parallel to the optical axis OA, are bounded by the boundary B2 as diaphragm opening and are focused onto the recording layer AZS1 by the objective lens O1. The two inner beams 5,6 indicate the beam path when reading from and/or writing to a CD and are incident on the objective lens OL from the left. The incident beam bundle is slightly divergent, since it has already passed through the diverging lens SL, and its polarization direction is rotated through 90° with respect to that of the polarization filter PF. It cannot, therefore, pass that region of the polarization filter PF which is situated between the boundaries B1 and B2. The incident light bundle is focused onto the recording layer AZS of the CD by the objective lens OL.

The optical recording media AT to be read from and/or written to can have vertical or distance deviations from the objective lens OL of up to several millimeters, whereas the respective focal point is permitted to be moved away merely by a few micrometers with respect to the recording layer AZS or AZS1 or AZS2 of the optical recording medium AT, in order to enable an optimum reading and/or writing operation. To this end, an automatic focusing system is used which regulates the distance of the objective lens OL from the recording layer AZS or AZS1 or AZS2 with the aid of a focus drive. The signals for controlling the focus drive are derived from signals emitted by the photodetector PD, that is to say parallel to the read-out of information.

According to the invention, therefore, a device for reading from and/or writing to recording media AT having different structures is proposed which operates using a single objective lens OL. The aperture is in this case adapted to the type of optical recording medium AT used by means of a polarization filter PF in the optical path. The wavefront can be corrected by means of a diverging lens SL which can be additionally introduced into the beam path. The diaphragm formed by the polarization filter PF is coupled to the objective lens OL. For this reason, the aperture which is co-determined by the diaphragm size is not changed in the event of the objective lens OL being displaced along the optical axis OA.

What is claimed is:

1. Device for writing to or reading from optical recording media having different structures, the device comprising:
   a light beam source;
   an objective lens disposed in a beam path of the light beam source;
   diaphragm means coupled to the objective lens for varying the diameter of a light beam passing through the objective lens; and
   a diverging lens adapted to be selectively introduced into the beam path between the light beam source and the objective lens to provide wavefront correction, the diverging lens being introduced into the beam path to provide wavefront correction when writing to or reading from an optical recording medium having a predetermined structure.

2. Device according to claim 1, wherein the diaphragm of variable diameter is formed by a liquid-crystal element.

3. Device according to claim 1, wherein the diaphragm of variable diameter is formed by a polarization filter.

4. Device according to claim 3, wherein the polarization filter is coupled to the objective lens.

5. Device according to claim 3, wherein a half-wave plate is provided for varying the diameter of the diaphragm with the polarization filter.

6. Device according to claim 1, wherein the diverging lens is coupled to a second optical element.

7. Device according to claim 1, wherein the optical recording medium is a recording medium for the reading and/or writing of information in digital form.

8. Device according to claim 1, wherein, for the purpose of writing to or reading from an optical recording medium having a structure which corresponds to a CD, an objective lens having a variable diaphragm is provided in a device which is provided for writing to or reading from optical recording media having a structure which corresponds to a DVD, and a half-wave plate and a diverging lens are provided in the beam path between the semi-transparent mirror and the objective lens.

9. Device according to claim 1, wherein, for the purpose of writing to or reading from a optical recording medium having a structure which corresponds to a CD, an objective lens having a variable diaphragm is provided in a device which is provided for writing to or reading from optical recoding media having a structure which corresponds to a DVD, and a half-wave plate and a diverging lens are provided in the beam path between the semi-transparent mirror and the objective lens.

10. Device for writing to or reading from optical recording media having different structures, the device comprising:
    a light beam source;
    an objective lens disposed in a beam path of the light beam source;
    diaphragm means coupled to the objective lens for varying the diameter of a light passing through the objective lens; and
    a wavefront correction means for providing wavefront correction, the wavefront correction means being introduced into the beam path between the light beam source and the objective lens when writing to or reading from an optical recording medium having a predetermined structure.

11. Device according to claim 10, wherein the wavefront correction means is a diverging lens.

12. Device according to claim 10, wherein the wavefront correction means is coupled to a further optical element.

13. Device according to claim 10, wherein the diaphragm of variable diameter is formed by a liquid-crystal element.

14. Device according to claim 10, wherein the diaphragm of variable diameter is formed by a polarization filter.

15. Device according to claim 14, wherein the polarization filter is coupled to the objective lens.

16. Device according to claim 14, wherein a half-wave plate is provided for varying the diameter of the diaphragm with the polarization filter.

17. Device according to claim 10, wherein the optical recording medium is a recording medium for the reading or writing of information in digital form.

18. Device according to claim 6, wherein the optical element is one of a half wave plate, polarizing means and diaphragm.

* * * * *